United States Patent [19]
Shumway

[11] Patent Number: 5,797,429
[45] Date of Patent: *Aug. 25, 1998

[54] LINEAR SPOOL VALVE DEVICE FOR WORK EXCHANGER SYSTEM

[75] Inventor: Scott Shumway, Hamilton, Bermuda

[73] Assignee: DesalCo, Ltd., Hamilton, Bermuda

[*] Notice: This patent issued on a continued prosecution application filed under 37 CFR 1.53(d), and is subject to the twenty year patent term provisions of 35 U.S.C. 154(a)(2).

[21] Appl. No.: 613,994

[22] Filed: Mar. 11, 1996

[51] Int. Cl.⁶ .................................................. F16K 11/07
[52] U.S. Cl. .................................. 137/625.69; 417/392
[58] Field of Search ................ 137/625.69; 91/464; 417/392

[56] References Cited

U.S. PATENT DOCUMENTS

| | | | |
|---|---|---|---|
| 651,334 | 6/1900 | Baker et al | 137/625.69 |
| 2,307,585 | 1/1943 | Harrington et al. | 137/625.69 |
| 2,958,340 | 11/1960 | Rosebrook | 137/625.69 |
| 3,460,440 | 8/1969 | Brent | 91/464 |
| 3,489,159 | 1/1970 | Cheng et al. | |
| 4,087,967 | 5/1978 | Knapp | 137/625.69 X |
| 5,306,428 | 4/1994 | Tonner | |

*Primary Examiner*—John Fox
*Attorney, Agent, or Firm*—Joseph G. Seeber

[57] ABSTRACT

A linear spool valve device is employed in a work exchanger system for directing flow of fluid therein. The device comprises a cylinder in which first and second pistons are movably disposed, a high pressure inlet located at substantially a central point along the length of the cylinder, and work exchanger ports located between respective ends of the cylinder and the high pressure inlet. Low pressure outlets can be provided at each end of the cylinder, or alternatively a single low pressure outlet can be provided. The design of the piston/cylinder arrangement is such that each of the work exchangers is alternately completely pressurized, partially pressurized, or completely depressurized, but only one work exchanger at a time is completely pressurized or completely depressurized.

18 Claims, 4 Drawing Sheets

FIG. 2

| VALVE NO. | PRESS EXCH. 22 | OVERLAP EXCH. 22 | ISOLATE EXCH. 24 | DEPRESS EXCH. 24 | FILL EXCH. 24 | PRESS EXCH. 24 | OVERLAP EXCH. 24 | ISOLATE EXCH. 22 | DEPRESS EXCH. 22 | FILL EXCH. 22 |
|---|---|---|---|---|---|---|---|---|---|---|
| 53 | x | □ | □ | □ | □ | □ | □ | x | x | x |
| 54 | x | x | x | x | x | x | x | x | x | □ |
| 55 | □ | x | x | x | x | x | x | □ | x | x |
| 56 | □ | □ | x | x | x | x | □ | x | □ | □ |
| 57 | x | x | x | x | □ | x | x | x | x | x |
| 58 | x | x | x | x | x | x | x | x | x | x |
| 59 | x | □ | □ | □ | □ | □ | □ | x | x | □ |
| 60 | x | x | x | x | x | □ | x | x | x | x |
| 61 | x | x | x | x | x | x | x | x | □ | □ |
| 62 | □ | □ | x | x | x | x | □ | □ | □ | x |
| 63 | x | x | x | x | □ | x | x | x | x | x |
| 64 | x | x | x | □ | x | x | x | x | x | x |

O = OPEN    X = CLOSED

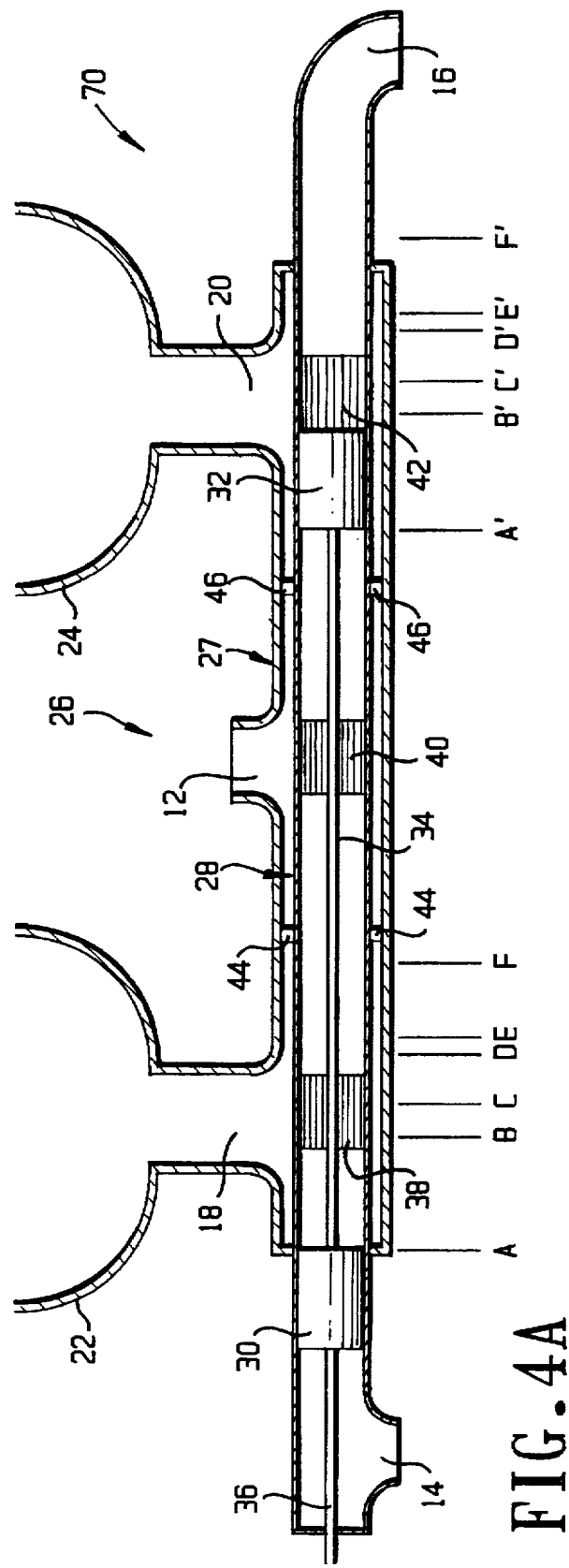
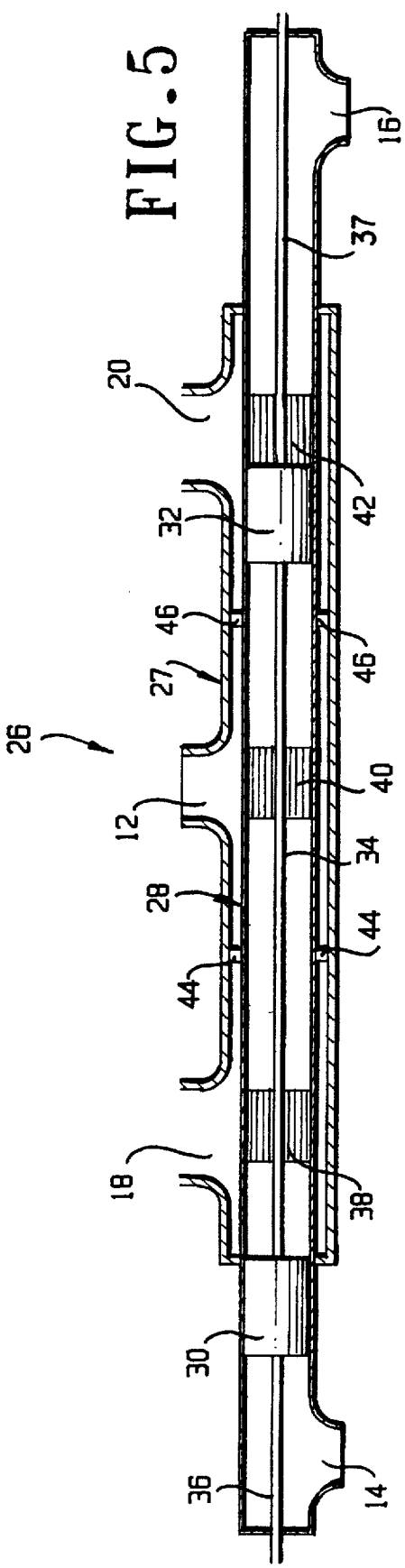

LINEAR SPOOL VALVE DEVICE FOR WORK EXCHANGER SYSTEM

TECHNICAL FIELD

The present invention generally relates to a linear spool valve device for directing the flow of fluid in a work exchanger system, and more particularly to a linear spool valve device which, when connected to first and second work exchanger pressure vessels, directs fluid under high pressure to one or both of the work exchangers and, alternatively, directs fluid under low pressure from the first and/or second work exchangers.

BACKGROUND ART

A work exchanger is a device that recovers fluid energy from one stream and delivers that energy to another stream. Work exchangers are well known in the prior art, as is evidenced by prior U.S. Pat. No. 3,489,159—Cheng et al, which discloses a method and apparatus for pressurizing and depressurizing fluids. In one embodiment, the invention of the aforementioned patent is applied to a reverse osmosis process.

Thus, work exchangers are currently in use in the desalinization industry, and in particular in connection with the reverse osmosis process used in that industry. Such work exchangers are used to recover pressure energy from the reject stream of a reverse osmosis process, which stream can represent 60% or more of the total energy required to pump a feed stream up to pressures needed for reverse osmosis. However, at this point in time, there are no commercially available work exchangers for energy recovery devices, and this is due to the complexity, size, and high degree of maintenance associated with such devices.

During recent history, attempts have been made to use work exchangers for the recovery of hydraulic energy from the reject stream of reverse osmosis systems, and the results of such an effort are disclosed in prior U.S. Pat. No. 5,306,428—Tonner. The Tonner patent discloses a rotary valving device used to direct brine to/from different work exchanger chambers. However, the rotary valve device of Tonner is not hydraulically balanced, and this is a major disadvantage. Specifically, the lack of hydraulic balance in the Tonner device causes excessive wear on the sealing surfaces due to side loads exerted on the center rotating assembly, and also creates internal and external leakage problems between the high pressure inlet and outlet ports and the low pressure drain ports. This, in turn, reduces the efficiency of the Tonner device and imposes size limits on any device which can realistically be manufactured.

A further, major disadvantage of the Tonner device relates to the fact that it does not have, in its operation, an "overlap period," that is, a period when brine is flowing into each work exchanger cylinder. This is a critical problem because the brine flow from the membranes in a reverse osmosis system must never be restricted.

Furthermore, in general, valve devices of the prior art used to control work exchanger systems continue to be complex and expensive, to be burdened by operational disadvantages (such as hesitation in the operation of the valves, resulting in inadvertent shutdown of the system), and to require stringent synchronization and control of multiple components within the system.

Thus, there is a need in the prior art for development of a less complex, less expensive, balanced, and more operationally consistent device for controlling the flow of fluids in work exchanger systems.

DISCLOSURE OF INVENTION

The present invention generally relates to a linear spool valve device for a work exchanger system, and more particularly a linear spool valve device which directs fluid under high pressure to first and/or second work exchangers and, alternatively, directs fluid under low pressure from first and/or second work exchangers.

In general, the linear spool valve device for the present invention comprises two pistons connected by a rod located inside a cylinder. The cylinder has four ports or connections: a high pressure inlet, a first work exchanger port, a second work exchanger port, and a low pressure fluid discharge outlet. During operation of the device, the high pressure inlet is at a high pressure corresponding to the pressure of reject fluid, coming (for example) from the membranes of a reverse osmosis system, while the first and second work exchangers vary between the aforementioned high pressure and the low pressure associated with the discharge outlet, the latter being close to atmospheric pressure. In accordance with the present invention, the work exchangers vary in pressure out of phase, depending on the location of the linear spool valve device, such that at least one work exchanger is at high pressure at all times. Furthermore, by moving the linear spool valve device back and forth within the cylinder, the work exchanger ports are alternately exposed and closed, and this directs flow in the proper sequence to the proper port.

The linear spool valve device of the present invention is uniquely designed so that its operation is hydraulically balanced axially, and thus no net axial thrust is generated during operation of the device. As a result, the force required to move the linear spool valve device is only that force needed to overcome the friction of the sealing surfaces associated with the pistons. That is to say, there are no hydraulic forces to overcome, and this permits the driving device associated with the present invention to be of low power. In the latter regard, the driving device can be of any construction capable of producing a reciprocating linear motion. Furthermore, the device of the present invention has no limitations as to size and flow rate, this being due to the lack of axial thrust exerted on the piston assembly of the linear spool valve device.

In addition, as a result of its unique design, the linear spool valve device of the present invention represents a significant improvement over prior art systems, and specifically over prior art valve systems, in that the device of the present invention is much less complex, and thus much less expensive, than prior art systems or devices. Furthermore, as a result of the unique and relatively simplistic design and operation of the present invention, it does not suffer from the operational problems or control/synchronization problems associated with devices of the prior art. Finally, the present invention represents a significant advance over rotary valve systems of the prior art, such as that disclosed in the Tonner patent, in that the invention disclosed herein is a balanced, rather than assymetric, device.

Therefore, it is a primary object of the present invention to provide a linear spool valve device for a work exchanger system.

It is a further object of the present invention to provide a linear spool valve device which, when connected to first and second work exchanger systems, directs fluid under high pressure to, or fluid under low pressure from, the first and/or second work exchangers.

It is a further object of the present invention to provide a linear spool valve device having a cylinder, first and second pistons mounted therein, and a rod interconnecting the first and second pistons so as to cause the first and second pistons to move along a straight line within the cylinder.

It is a further object of the present invention to provide a linear spool valve device which, when used with two work exchangers, maintains at least one of the work exchangers at high pressure at all times.

It is a further object of the present invention to provide a linear spool valve device which smoothly increases and decreases the pressure in the work exchangers by detailed design of the pistons employed in the linear spool valve device.

The above and other objects, and the nature of the invention, will be more clearly understood by reference to the following detailed description, the appended claims, and the accompanying drawings.

BRIEF DESCRIPTION OF DRAWINGS

FIG. 2 is a table illustrating the status of various valves employed in the prior art system of FIG. 1.

FIGS. 4A–4B are more detailed diagrammatic representations of the linear spool valve device of the present invention in various operational stages.

FIG. 5 is a side, cross-sectional view of a preferred design for the pistons employed in the linear spool valve device of the present invention which emphasizes the axial hydraulic balance.

BEST MODE FOR CARRYING OUT THE INVENTION

The invention will now be described in more detail with reference to the various figures of the drawings.

Figure 1:
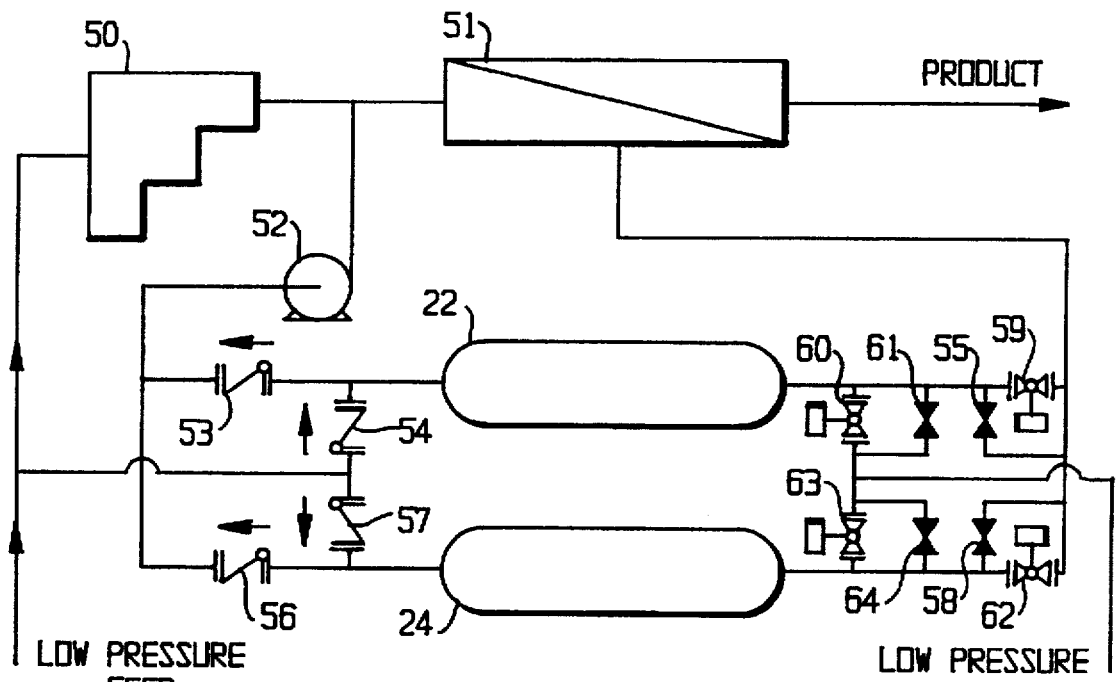
FIG. 1 is a diagrammatic representation of a work exchanger system of the prior art.

FIG. 1 is a diagrammatic representation of a work exchange system of the prior art. As seen therein, the system 10 of the prior art comprises the following components: energy recovery vessels or work exchangers 22 and 24, high pressure feed pump 50, reverse osmosis (RO) membrane array 51, energy recovery boost pump 52, sea water delivery check valves 53 and 56, sea water fill check valves 54 and 57, brine dump valves 60 and 63, depressurize valves 61 and 64, pressurize valves 55 and 58, and brine fill valves 59 and 62.

FIG. 2 is a table illustrating the status of the various valves employed in the prior art system of FIG. 1. The table of FIG. 2 will be utilized to describe the sequence of operations carried out in the prior art system of FIG. 1.

Referring to FIGS. 1 and 2, the first stage of operation of the system 10 is best described as "pressurize exchanger 22" and, during that stage of operation, valves 55, 56 and 62 are open while the remaining valves are closed. As a result, exchanger 22 is pressurized, brine from RO membrane array 51 is provided to exchanger 24, and exchanger 24 provides fluid via valve 56 and booster pump 52 to RO membrane array 51.

The next stage of operation is best described as "overlap exchanger 22" and, in this stage of operation, valves 53, 56, 59 and 62 are open while the remaining valves are closed. Brine from array 51 is provided to both exchangers 22 and 24, and the exchangers 22 and 24 provide fluid, via valves 53 and 56, respectively, and via booster pump 52, to the array 51.

The next stage of operation is best described as "isolate exchanger 24" and, in this stage, valves 53 and 59 are open while the remaining valves are closed. Exchanger 22 continues to receive the brine from array 51, and continues to provide fluid via valve 53 and pump 52 to the array 51, but exchanger 24 does not receive or provide fluid.

The next stage of operation is best described as "depressurize exchanger 24" and, in this stage, valves 53, 59 and 64 are open while the remaining valves are closed. Exchanger 22 continues to receive brine from array 51 and to provide fluid to array 51, while exchanger 24 is subjected to depressurization via depressurize valve 64.

The next stage of operation is best described as "fill exchanger 24" and, in this stage, valves 53, 57, 59 and 63 are open while the remaining valves are closed. Exchanger 22 continues to receive brine from array 51 and to provide fluid, via valve 53 and pump 52, to the array 51, while fluid flows out of exchanger 24 via brine dump valve 63 (that is to say, exchanger 24 provides a low pressure brine output as part of a filling operation). During this stage, seawater fill check valve 57 is open but seawater fill check valve 54 is closed, thereby preventing high pressure water from leaking out to the low pressure fill area associated with exchanger 24.

The next stage of operation is best described as "pressurize exchanger 24" and, in this stage, valves 53, 58 and 59 are open while the remaining valves are closed. Exchanger 22 continues to receive brine from array 51 and to provide fluid, via valve 53 and pump 52, to the array 51, while exchanger 24 is pressurized via pressurize valve 58.

The next stage of operation is best described as "overlap exchanger 24" and, in this stage, valves 59 and 62 are open while the remaining valves are closed. As in the previous "overlap" stage, both exchangers 22 and 24 are exposed to high pressure brine input from array 51, and both exchangers 22 and 24 provide fluid output, via valves 53 and 56, respectively, and via pump 52, to the array 51.

The next stage of operation is best described as "isolate exchanger 22" and, in this stage, valves 56 and 62 are open while the remaining valves are closed. Thus, there is no flow of fluid into or out of exchanger 22, while brine flows into exchanger 24 via valve 62, and fluid flows from exchanger 24, via valve 56 and pump 52, to array 51.

The next stage of operation is best characterized as "depressurize exchanger 22", and, in this stage, valves 56, 61 and 62 are open while the remaining valves are closed. Thus, exchanger 24 continues to receive brine via valve 62 from array 51, and to provide fluid, via valve 56 and pump 52, to the array 51, while exchanger 22 is subjected to depressurization via depressurize valve 61.

The final stage of operation is best described as "fill exchanger 22" and in this stage, valves 54, 56, 60 and 62 are open while the remaining valves are closed. Exchanger 24 continues to receive brine from array 51 and to provide fluid, via valve 56 and pump 52, to the array 51, while exchanger 22 dumps brine via valve 60 (that is, exchanger 22 provides a low pressure brine output as a part of filling operation). In this stage, seawater check valve 54 is open but seawater fill check valve 57 is closed, thereby preventing high pressure water from leaking out to the low pressure fill area associated with exchanger 22.

Figure 3:
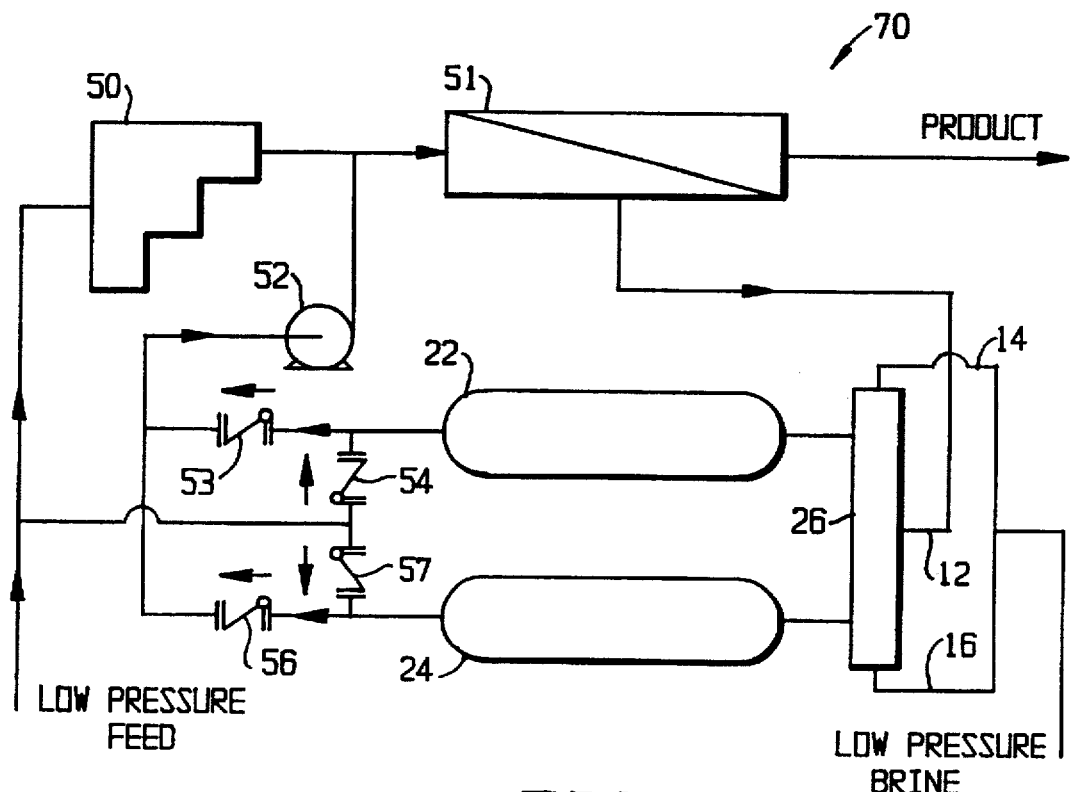
FIG. 3 is a diagrammatic representation of the linear spool valve device of the present invention used in a work exchanger system.

FIG. 3 is a diagrammatic representation of the linear spool valve device of the present invention used in a work exchanger system. As seen therein, the system 70 of FIG. 3 comprises the following basic components: energy recovery vessels or work exchangers 22 and 24, linear spool valve device 26, high pressure feed pump 50, RO membrane array 51, energy recovery booster pump 52, sea water delivery check valves 53 and 56, and sea water fill check valves 54 and 57.

Thus, in accordance with the present invention, the linear spool valve device 26 receives brine, via high pressure inlet 12, from the array 51, and provides low pressure brine output via low pressure outputs 14 and 16. In addition, flow of fluid between exchangers 22 and 24, on the one hand, and linear spool valve device 26, on the other hand, takes place via exchanger ports 18 and 20, respectively, of FIG. 4A. Thus, the employment of the linear spool valve device 26 of the present invention substantially reduces the complexity of arrangements of the prior art by replacing the pressurize valves 55 and 58, depressurize valves 61 and 64, brine dump valves 60 and 63, and brine fill valves 59 and 62 of FIG. 1 with the single linear spool valve device 26 of FIG. 3.

The operation of the linear spool valve device 26 will now be described with reference to FIGS. 4A and 4B, which are more detailed diagrammatic representations of the linear spool valve device of the present invention in its various operational stages.

As seen therein, the system 70 comprises the following components: high pressure inlet 12, low pressure outlets 14 and 16, work exchanger ports 18 and 20, work exchangers 22 and 24, and brine spool valve device 26.

The brine spool valve device 26 comprises the following components: outer cylinder or shell 27, inner cylinder 28, pistons 30 and 32, rod 34, and drive member 36. Rod 34 interconnects pistons 30 and 32 so that the latter move in unison. In this embodiment, drive member 36 is connected to one of the pistons (in FIG. 1, to piston 30), and is connected at its other end to a suitable drive mechanism for moving the pistons 30 and 32 in unison within the cylinder 28.

High pressure inlet 12 is connected to a source of high pressure fluid, that is, to the brine outlet of the RO membrane array 51 (FIG. 3). Low pressure outlets 14 and 16 are connected to a low pressure drain in order to facilitate low pressure brine discharge from the work exchanger system 70. Finally, work exchanger ports 18 and 20 are connected to work exchangers 22 and 24, respectively, so as to direct brine to or from the respective work exchangers 22 and 24.

As indicated below, low pressure outlets 14 and 16 can be combined into a single low pressure outlet. For example, the pistons 30 and 32 can be sized in such a manner that rod 34 could be a hollow shaft connecting one low pressure side of the system 10 to the other, thereby enabling the number of low pressure ports to be reduced to one.

During operation, the high pressure inlet 12 is at a pressure corresponding to the pressure of fluid emanating from the brine outlet of the RO array 51 (FIG. 3) connected to inlet 12, while work exchangers 22 and 24 vary between high pressure (corresponding to the pressure at inlet 12) and low pressure (corresponding to the pressure at outlets 14 and 16), the latter being close to atmospheric pressure in this embodiment. As will be explained in more detail below, the work exchangers 22 and 24 vary in pressure out of phase, depending on the location of the device 26, such that at least one of the work exchangers 22 and 24 is at high pressure at all times. By moving the pistons 30 and 32 back and forth in the cylinder 28, ports 18 and 20 are alternately exposed and closed so as to direct fluid flow in proper sequence to the proper port.

The operation of the present invention will now described in more detail with reference to FIGS. 4A and 4B, in which the positions of pistons 30 and 32 at various stages of operation are designated by alphabetic characters A,B, . . . (indicating the position of the inside or right edge of piston 30) and A', B' . . . (indicating the position of the inside or left edge of piston 32).

Referring to FIG. 4A, in the stage of operation described as "fill exchanger 24", pistons 30 and 32 are in positions A and A', respectively, and exchanger 22 remains subject to high pressure from inlet 12, while exchanger 24 remains connected to low pressure outlet 38. It should be noted that, in this stage of operation, flow of fluid is into exchanger 22, but out of exchanger 24. This permits exchanger 24 to be filled with sea water.

In the stage of operation described as "pressurize exchanger 24," pistons 30 and 32 are moved to positions B and B', respectively, so that piston 32 blocks exchanger 24 relative to low pressure outlet 38, and partially exposes exchanger 24 to high pressure inlet 12, while piston 30 is in such a position that exchanger 22 remains exposed to high pressure inlet 12. Thus, this stage represents the beginning of pressurization of exchanger 24. Flow is into exchangers 22 and 24, but there is no flow in low pressure outlets 14 and 16.

In the stage of operation which can be best described as "overlap exchanger 24", pistons 30 and 32 are moved to positions C and C', respectively. Both exchangers 22 and 24 are exposed to the high pressure inlet 12, and thus, flow of fluid is into both exchangers 22 and 24, but there is no flow in low pressure outlets 14 and 16.

In the stage of operation best described as "isolate exchanger 22," pistons 30 and 32 are moved to positions D and D', respectively. Work exchanger 22 is blocked by piston 30 from access to high pressure inlet 12, while work exchanger 24 has complete access to inlet 12. Thus, there is no flow of fluid into or out of exchanger 22, while flow of fluid under high pressure into exchanger 24 takes place. There is no flow in low pressure outlets 14 and 16.

In the stage of operation best described as "depressurize exchanger 22", pistons 30 and 32 move to positions E and E', respectively. Exchanger 22 is partially exposed to low pressure outlet 14, while exchanger 24 remains completely exposed to high pressure inlet 12. Flow of fluid is out of exchanger 22 and into exchanger 24, with no flow through low pressure outlet 16.

In the stage of operation best described as "fill exchanger 22", pistons 30 and 32 move to positions F and F', respectively. In this stage, exchanger 22 is completely exposed to low pressure outlet 14, while exchanger 24 remains completely exposed to high pressure inlet 12. Flow of fluid remains out of exchanger 22 and into exchanger 24, while there is outward flow through low pressure outlet 14. This permits exchanger 22 to be filled with seawater.

Figure 4B:
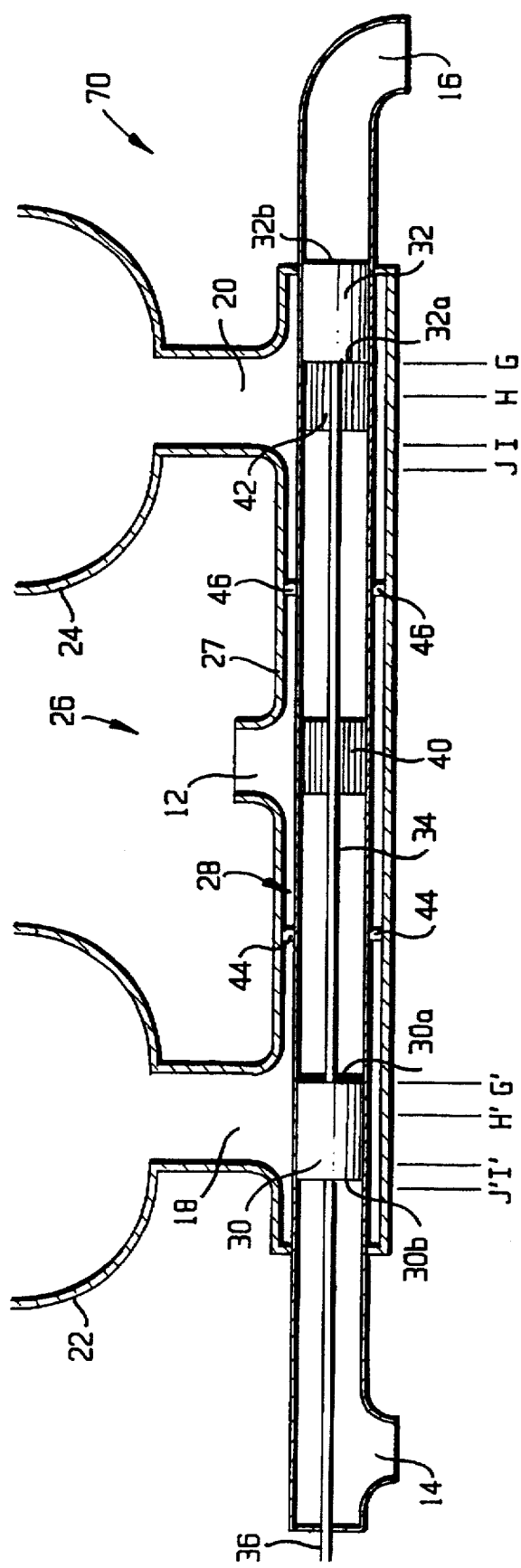

Referring to FIG. 4B, in the stage of operation best described as "pressurize exchanger 22", pistons 30 and 32 are moved to positions G and G', respectively. Thus, piston 30 blocks exchanger 22 relative to low pressure outlet 14 but partially exposes exchanger 22 to high pressure inlet 12, while piston 32 is in such a position that exchanger 24 remains exposed to high pressure inlet 12. Thus, this stage represents the beginning of pressurization of exchanger 22. Flow is into exchangers 22 and 24, but there is no flow in low pressure outlet 14 and 16.

In the stage of operation best described as "overlap exchanger 22", pistons 30 and 32 move to positions H and H′, respectively. The designation "overlap" is intended to reflect the fact that high pressure fluid from inlet 12 is provided to both work exchangers 22 and 24 at the same time. There is still no flow in low pressure outlets 14 and 16.

In the stage of operation characterized as "isolate exchanger 24", the pistons 30 and 32 move to positions I and I′, respectively. Port 20 is blocked, while port 18 is completely exposed to high pressure inlet 12. Thus, work exchanger 22 is completely exposed to the high pressure fluid entering through inlet 12, while work exchanger 24 is not. There is still no flow in low pressure outlets 14 and 16.

In the stage of operation characterized as "depressurize exchanger 24", pistons 30 and 32 are moved to positions J and J′, respectively. Exchanger 22 remains completely exposed to high pressure fluid at inlet 12, while exchanger 24 is exposed, via low pressure outlet 16, to the low pressure drain, and there is no outward flow through low pressure outlet 16.

Thus, it can be seen that, in accordance with the present invention, the pistons 30 and 32 move back and forth within the cylinder 28 and, as a result, ports 18 and 20 (which communicate with work exchangers 22 and 24, respectively) are alternately exposed and closed, thereby directing fluid flow in proper sequence to the proper port.

It should be noted that the unique design and port arrangement of the present invention is hydraulically balanced axially, and therefore no net axial thrust is generated due to operation of the invention. As a result, the force required to move the linear spool valve device 26 is only that force necessary to overcome the friction of the sealing surfaces (not shown) associated with pistons 30 and 32. That is to say, there are no hydraulic forces to overcome. This permits one to employ a driving device (for driving the pistons 30 and 32) which is of low power. In fact, the driving device can be of any construction capable of producing a reciprocating linear motion of the pistons 30 and 32 and rod 34, with a pause in movement taking place at the outer limits of motion. Furthermore, as a result of the unique design of the present invention, it can be sized such that flow conditions through the device 26 are of low hydraulic restriction, that is, there are no limitations as to size and flow rate on the device as might result from lack of axial thrust on the pistons 30 and 32.

It should be emphasized that the device 26 must be mechanically constructed such that each end of the spool valve device 26 (i.e., each piston 30 and 32) completely covers its work exchanger port. In this way, flow to and from the work exchanger served by the particular port is effectively stopped. In the latter regard, absolute sealing of the port is not necessary, but the flow must be significantly reduced; this is the meaning of the terms "isolate exchanger 22" and "isolate exchanger 24" used above. Another significant feature of the present invention is that the spool valve device 26 and associated cylinder 28 are designed such that both work exchanger ports 18 and 20 are not completely covered by the spool valve device 26 at the same time. As indicated above, there are times, during operation of the device 26, when ports 18 and 20 are both partially exposed, and this is referred to as "overlap" in the above discussion, since high-pressure fluid is capable of flowing briefly into both work exchangers 22 and 24 at the same time. In other words, in accordance with the present invention, the percentage by which one exchanger port is open and the percentage by which the other exchanger port is open should total, at all times, approximately 100% or greater. This ensures that the brine stream from the RO membrane array 51 of FIG. 3 is not completely closed off at any time, this being a requirement which is met by the present invention.

In addition, the design of the linear spool valve device 26 of the present invention (as seen in FIGS. 4A and 4B) is such that there is never a direct connection between high pressure inlet 12 and low pressure outlets 14 and 16, respectively. That is to say, if high pressure inlet 12 is connected to exchanger port 18, the path between exchanger port 18 and low pressure outlet 14 is blocked; similarly, if high pressure inlet 12 is connected to exchanger port 20, the path between exchanger port 20 and low pressure outlet 16 is blocked.

Further referring to FIG. 4, high pressure fluid entering the device 26 via inlet 12 is blocked by barriers 44a, 44b, 46a and 46b from occupying the annular space between the outer cylinder 27 and the inner cylinder 28. Furthermore, the surface of inner cylinder 28 is provided with longitudinal slots 38, 40 and 42 arrayed along the circumferential surface of the cylinder 28. The slots 40 serve as a path by means of which the high pressure fluid entering via inlet 12 proceeds into the interior of cylinder 28, while the slots 38 and 42 serve as a path by means of which the high pressure fluid exits the cylinder 28 and enters exchanger ports 18 and 20, respectively. This unique arrangement allows for an improved flow path for the high pressure fluid, minimizes the pressure drop experienced by the fluid, and ensures that loads are hydraulically balanced throughout the stroke of the pistons 30 and 32. That is to say, the latter advantages are achieved as a result of the fact that high-pressure fluid enters and exits the cylinder 28 of device 26 radially instead of through one side or the other of the cylinder 28.

As mentioned above, in one embodiment of the invention, low pressure outlets 14 and 16 are maintained at substantially atmospheric pressure while inlet 12 is at higher than atmospheric pressure. However, in another embodiment, it is possible to maintain the low pressure outlets 14 and 16 at a pressure substantially higher than that of the atmosphere, in which case the high pressure inlet 12 is maintained at an even higher pressure relative to the pressure level at low pressure outlets 14 and 16.

In such an embodiment of the invention, wherein the pressure level at outlets 14 and 16 is substantially higher than atmospheric pressure, the force exerted by that pressure on the left side (in FIGS. 4A and 4B) of piston 30 will necessarily be less than the force exerted by the pressure at outlet 16 on the right side of piston 32. This is due to the fact that the force is equal to the product of pressure and area upon which the pressure acts, and due to the fact that the drive member 36 occupies a certain amount of the area of the left face of piston 30, resulting in a reduction in the effective area of the face of piston 30, whereas no such reduction in the effective area of the right face of piston 32 takes place. This force could be harmful to the operation of the linear spool device 26, but the present invention includes a solution to such problem, as will now be described.

FIG. 5 is a side, cross-sectional view of a modified driving arrangement for the right-hand piston of FIGS. 4A and 4B. This modified driving arrangement compensates for the "force in balance" problem just described. As seen in FIG. 5, piston 32 is provided with its own driving member 37, driving members 36 and 37 being connected, in this embodiment, either to separate, but synchronized, actuators or to a single, common actuator.

As mentioned above in connection with FIGS. 4A and 4B, at various stages of operation of the linear spool device 26, exchangers 22 and 24 are either pressurized or depressurized. It is considered important, from a practical point of view, to control the rate of pressurization and depressurization of exchangers 22 and 24. Such control of the rate of pressurization and depressurization provides time for check valves (not shown) on opposite ends of the exchangers 22 and 24 to close. Control of the rate of pressurization and depressurization is also important from the standpoint of reducing wear and tear on components of the system.

Figure 6:
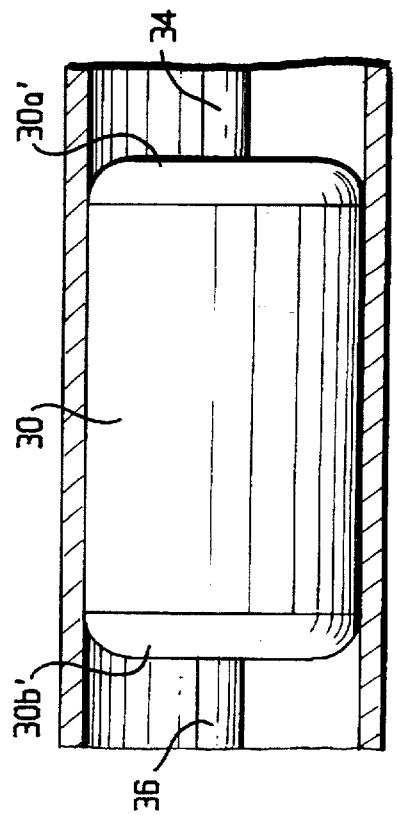
FIG. 6 is a side, cross-sectional view of the left-hand piston of FIGS. 4A and 4B.

Accordingly, FIG. 6 is a side, cross-sectional view of a preferred design for the pistons employed in the linear spool valve device of the present invention. This unique design of the pistons 30 and 32 of device 26 is provided for the purpose of controlling the rate of pressurization and depressurization of exchangers 22 and 24. Specifically, whereas the pistons 30 and 32 shown in the embodiment disclosed in FIGS. 4A and 4B have generally rectangular side cross-sections, the inner faces 30a, 32a and outer faces 30b, 32b of the pistons 30 and 32, respectively, can be modified to control the rate of pressurization and depressurization of the exchangers 22 and 24 during operation of the device 26. Thus, by way of example, and as seen in the embodiment of FIG. 6, inner face 30a and outer face 30b of piston 30 are modified so as to be curved at the upper and lower edges, or to be generally curved, oval or convex in shape.

It should be noted that, in the present invention, there are no external high pressure seals. The only external seal is a low pressure seal associated with the drive members 36 and 37. However, if seals are required, the pistons 30 and 32 can be sealed by multiple piston rings, such piston rings (not shown) sliding within the cylinder 28 where ports 18 and 20 are alternately exposed and closed. Ports 18 and 20 are designed such that a piston ring can slide over them, and may include a perforated screen, well screen material, or any mechanism that reduces wear on the rings but still provides a proper flow path. The port arrangement may include a radial screen or wall screen arrangement, with an annular space behind such screen connected to the work exchangers 22 and 24, such that non-axial forces are balanced during the entire stroke of the pistons 30 and 32, including pressurization and depressurization of the work exchangers 22 and 24.

The device may be made of corrosion-resistant materials, or of any other material which is appropriate, given the operation and functions of the device as described above. In that regard, sliding surfaces may be treated with hard materials to prevent erosion of the cylinder surface by leakage.

As mentioned above, the pistons 30 and 32 can be driven by any means consistent with the operation and functions of the present function, including external linear positions, worm drives, or a pneumatic system. Moreover, the pistons 30 and 32 can be driven internally by hydraulic pressure or by a perpetual screw/gear drive. As mentioned above, the pistons 30 and 32 can be sized in such a manner that a hollow shaft can connect one low-pressure side to the other, thereby reducing the number of low-pressure outlets 14 and 16 (in FIG. 1) to a single low-pressure outlet 38 (seen in FIGS. 2A–2J). In addition, in order to reduce expected wear and tear on the surfaces of work exchanger ports 18 and 20 and on the piston rings of pistons 30 and 32, the device 26 can include external pressurize and depressurize valves connected to ports 18 and 20.

To summarize, the device 26 of the present invention eliminates complex valve assemblies and arrangements of the prior art (for example, eliminating as many as eight 2-way, on-off valves and their associated problems), replacing such complex valve assemblies with a single balanced device which is easily maintainable and has no external high-pressure seals.

While preferred forms and arrangements have been shown in illustrating the invention, it is to be understood that various changes and modifications can be made without departing from the spirit and scope of this disclosure.

I claim:

1. A work exchanger system, comprising:
    a first work exchanger,
    a second work exchanger, and
    linear spool valve means connected to said first work exchanger and to said second work exchanger for directing fluid under high pressure to said first and second work exchangers and for directing fluid under low pressure from said first and second work exchangers.

2. The system of claim 1, wherein at least one of said first and second work exchangers is at high pressure at all times.

3. The system of claim 1, wherein said linear spool valve means comprises a cylinder, first and second pistons disposed in said cylinder, and a rod interconnecting said first and second pistons and extending along a length of said cylinder.

4. The system of claim 3, further comprising moving means connected to at least one of said first and second pistons for moving said first and second pistons.

5. The system of claim 4, wherein said moving means comprises a driving member connected to said first piston.

6. The system of claim 5, wherein said moving means comprises an additional driving member connected to said second piston.

7. The system of claim 3, wherein said first and second pistons, when viewed from a side thereof, have a shape which is one of substantially circular, substantially orval, and substantially convex in configuration.

8. The system of claim 3, wherein said first and second pistons include upper and lower edges which are curved.

9. The system of claim 1, wherein said linear spool valve means comprises a cylinder, first and second pistons disposed in said cylinder, a high pressure inlet located at substantially a central point along a length of said cylinder for providing high pressure fluid to said cylinder, and first and second ports located between respective ends of said cylinder and said high pressure inlet, said first port being connected to said first work exchanger and said second port being connected to said second work exchanger.

10. The system of claim 9, wherein said first piston seals off said first port at some point during its movement, and wherein said second piston seals off said second port at some point during its movement.

11. The system of claim 10, wherein said first piston does not seal off said first port at the same time that said second piston seals off said second port, and said second piston does not seal off said second port at the same time that said first piston seals off said first port.

12. The system of claim 9, wherein said first work exchanger is depressurized when said first piston is located between said first port and said high pressure inlet means.

13. The system of claim 9, wherein said second work exchanger is depressurized when said second piston is located between said second port and said high pressure inlet means.

14. The system of claim 9, wherein said cylinder has a first end adjacent to said first port and a second end adjacent to said second port, and wherein said first work exchanger is pressurized when said first piston is located between said first end and said first port.

15. The system of claim 14, further comprising a low pressure outlet located at said first end.

16. The system of claim 9, wherein said cylinder has a first end adjacent to said first port and a second end adjacent to said second port, and wherein said second work exchanger is pressurized when said second piston is located between said second end and said second port.

17. The system of claim 16, further comprising a low pressure outlet located at said second end.

18. The system of claim 16, said linear spool valve means comprising at least one low pressure outlet.

* * * * *